(12) United States Patent
Kanno et al.

(10) Patent No.: US 9,714,026 B2
(45) Date of Patent: Jul. 25, 2017

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Yoshihito Kanno, Numazu (JP); Gohki Kinoshita, Isehara (JP); Hiroki Morita, Hiratsuka (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/063,767

(22) Filed: Mar. 8, 2016

(65) Prior Publication Data

US 2016/0264125 A1 Sep. 15, 2016

(30) Foreign Application Priority Data

Mar. 11, 2015 (JP) .................. 2015-048213

(51) Int. Cl.
*B60W 20/13* (2016.01)
*B60W 20/30* (2016.01)
(Continued)

(52) U.S. Cl.
CPC ............ *B60W 20/13* (2016.01); *B60W 10/06* (2013.01); *B60W 10/11* (2013.01); *B60W 10/26* (2013.01);
(Continued)

(58) Field of Classification Search
CPC ...... B60W 20/13; B60W 20/30; B60W 10/11; B60W 10/115; B60W 30/19; B60W 2710/1005
See application file for complete search history.

(56) References Cited

U.S. PATENT DOCUMENTS 5,951,614 A * 9/1999 Tabata ............... B60K 6/48
180/65.25
6,081,042 A * 6/2000 Tabata ............... B60K 6/365
180/65.25
(Continued)

FOREIGN PATENT DOCUMENTS

JP H11-125328 A 5/1999
JP 2005308007 A * 11/2005
(Continued)

*Primary Examiner* — Behrang Badii
*Assistant Examiner* — David Testardi
(74) *Attorney, Agent, or Firm* — Andrews Kurth Kenyon LLP

(57) ABSTRACT

A control apparatus for a hybrid vehicle is provided with a first charge controlling device configured to maintain output of an internal combustion engine at a predetermined value or more, and to charge a power storing device with an output excess with respect to an output request for the internal combustion engine. The control apparatus includes a second charge controlling device configured to charge the power storing device with an output increment caused by upshift of a gear shifting device. The control apparatus further includes a transmission time changing device configured to extend an execution time of the upshift or to delay start timing of the upshift, in order to prevent charge power for the power storing device from exceeding an input limit value for the power storing device, if the control time of the output reduction request overlaps the control time of the upshift request.

6 Claims, 13 Drawing Sheets

(51) Int. Cl.
*B60W 10/06* (2006.01)
*B60W 10/11* (2012.01)
*B60W 10/26* (2006.01)
*B60W 20/16* (2016.01)

(52) U.S. Cl.
CPC ............ *B60W 20/16* (2016.01); *B60W 20/30* (2013.01); *B60W 2710/0677* (2013.01); *B60W 2710/1005* (2013.01); *B60W 2710/244* (2013.01); *Y02T 10/6239* (2013.01); *Y02T 10/7005* (2013.01); *Y02T 10/7077* (2013.01); *Y02T 10/7275* (2013.01); *Y10S 903/93* (2013.01)

(56) References Cited

U.S. PATENT DOCUMENTS

| | | | |
|---|---|---|---|
| 6,186,255 B1 | 2/2001 | Shimasaki et al. | |
| 8,727,820 B2 | 5/2014 | Stasolla et al. | |
| 2007/0232440 A1* | 10/2007 | Han | B60K 6/485 477/3 |
| 2008/0093141 A1* | 4/2008 | Muta | B60K 6/40 180/65.265 |
| 2008/0110684 A1* | 5/2008 | Kaita | B60K 6/445 180/65.265 |
| 2008/0196952 A1* | 8/2008 | Soliman | B60K 6/48 180/65.25 |
| 2010/0102767 A1* | 4/2010 | Endo | B60K 6/445 318/453 |
| 2011/0174559 A1* | 7/2011 | Saito | B60K 6/48 180/65.27 |
| 2011/0313602 A1* | 12/2011 | Hirata | B60K 6/365 701/22 |
| 2012/0198869 A1* | 8/2012 | Morita | B60H 1/3208 62/126 |
| 2014/0148985 A1* | 5/2014 | Sato | B60W 20/00 701/22 |
| 2014/0229048 A1 | 8/2014 | Kawata et al. | |
| 2015/0006000 A1 | 1/2015 | Kawata et al. | |
| 2015/0012159 A1* | 1/2015 | Honda | B60K 6/547 701/22 |
| 2015/0197242 A1* | 7/2015 | Yamazaki | B60W 20/30 701/22 |
| 2016/0244043 A1* | 8/2016 | Nefcy | B60W 10/26 |
| 2016/0244049 A1* | 8/2016 | Petridis | B60W 20/30 |

FOREIGN PATENT DOCUMENTS

| | | | |
|---|---|---|---|
| JP | 2006125589 A | * | 5/2006 |
| JP | 2007099119 A | * | 4/2007 |
| JP | 2007106312 A | * | 4/2007 |
| JP | 2007216784 A | * | 8/2007 |
| JP | 2009197857 A | * | 9/2009 |
| JP | 2010143511 A | * | 7/2010 |
| JP | 2013-052799 A | | 3/2013 |
| WO | 2013/035730 A1 | | 3/2013 |

* cited by examiner

FIG. 4

|  | C1 | C2 | B1 | B2 | F1 |
|---|---|---|---|---|---|
| 1st | ○ |  |  | ○ | ○ |
| 2nd | ○ |  | ○ |  |  |
| 3rd | ○ | ○ |  |  |  |
| 4th |  | ○ | ○ |  |  |
| N |  |  |  |  |  |

○ : ENGAGEMENT

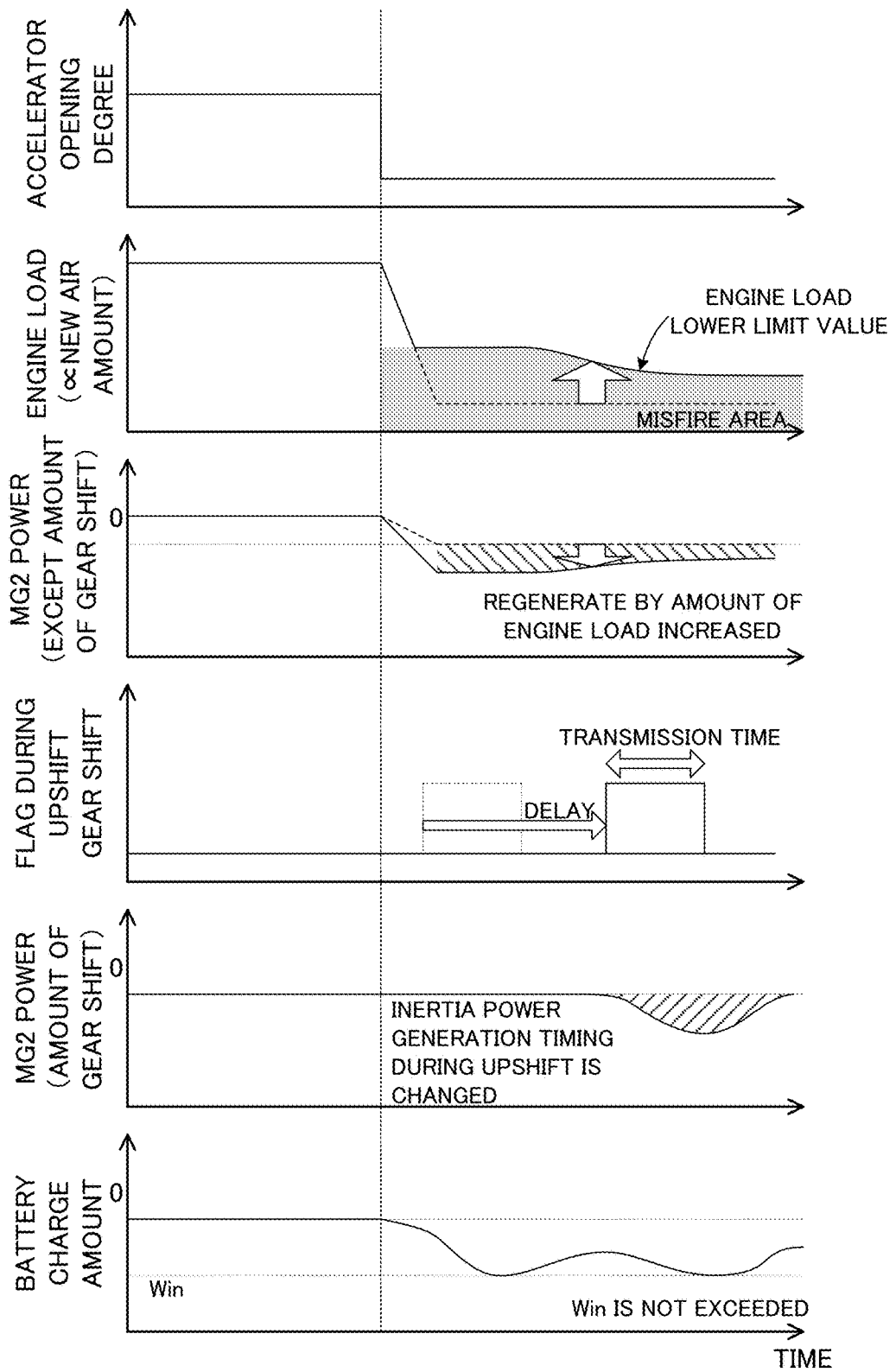

CONTROL APPARATUS FOR HYBRID VEHICLE

CROSS-REFERENCE TO RELATED APPLICATIONS

This application is based upon and claims the benefit of priority of the prior Japanese Patent Application No. 2015-048213, filed on Mar. 11, 2015, the entire contents of which are incorporated herein by reference.

BACKGROUND OF THE INVENTION

1. Field of the Invention

Embodiments of the present invention relate to a control apparatus for a hybrid vehicle, configured to control a hybrid vehicle provided, for example, with an internal combustion engine and an electric motor as a power source.

2. Description of the Related Art

For this type of control apparatus for the hybrid vehicle, there is known an apparatus configured to switch between transmission stages in view of regenerative power. For example, WO2013/035730 discloses a technology in which it is determined whether or not the transmission stage is actually switched based on a first charge amount by regeneration while the transmission stage is held and a second charge amount by regeneration while the transmission stage is changed. According to such a technology, it is considered that the regenerative power can be efficiently obtained during gear shift so that fuel efficiency of the vehicle can be improved.

In the hybrid vehicle, if it is required to reduce engine output, i.e. if there is an engine output reduction request, the engine output is maintained at a predetermined value or more to prevent a misfire. In this case, a battery may be charged with excess engine output with respect to required output, as the regenerative power. On the other hand, even if it is required to shift up, i.e. even if there is an upshift request, there is an output increment due to the transmission stage shifting. Even in this case, if the battery is charged with the output increment as the regenerative power, energy can be efficiently used without a waste.

If, however, the engine output reduction request and the upshift request occur simultaneously, the regenerative power becomes too high and exceeds an allowable maximum charging power, which is technically problematic. Moreover, if the charging power is forcibly suppressed even though it is required to perform charging over the allowable maximum charging power, unexpected driving force variation or the like causes a reduction in drivability, which is also technically problematic.

SUMMARY

The problems to be solved by embodiments of the present invention include the aforementioned problems as one example. It is therefore an object of embodiments of the present invention to provide a control apparatus for a hybrid vehicle that can preferably perform the regeneration during the gear shift.

The above object of embodiments of the present invention can be achieved by a control apparatus for a hybrid vehicle including a power supply including an internal combustion engine and a rotary electric machine; a power storing device configured to perform charging by regeneration on the rotary electric machine; and a gear shifting device configured to change a transmission ratio. The control apparatus includes a first charge controlling device configured to maintain output of the internal combustion engine at a predetermined value or more if there is an output reduction request for the internal combustion engine, and to charge the power storing device with an output excess with respect to an output request for the internal combustion engine. A second charge controlling device is provided that is configured to charge the power storing device with an output increment caused by upshift of the gear shifting device if there is an upshift request for the gear shifting device. Also a transmission time changing device is provided that is configured to extend an execution time of the upshift or to delay start timing of the upshift, in order to prevent charge power for the power storing device from exceeding an input limit value for the power storing device, in comparison with a case where a control time of the output reduction request does not overlap a control time of the upshift request, if the control time of the output reduction request overlaps the control time of the upshift request.

The hybrid vehicle according to embodiments of the present invention is a vehicle that is provided with: the internal combustion engine, which can adopt various aspects regardless of fuel type, fuel supply aspect, fuel combustion aspect, intake/exhaust system configuration, cylinder arrangement, or the like; and the rotary electric machine, which can be configured as an electric motor generator, such as, for example, a motor generator, as the power supply configured to supply power to a drive shaft. The hybrid vehicle according to embodiments of the present invention is provided with the power storing device, which can be configured as, for example, a lithium ion battery or the like. The power storing device can be charged by the regeneration on the rotary electric machine. The power storing device may function as an electric power supply source configured to supply electric power for power running of the rotary electric machine.

The hybrid vehicle according to embodiments of the present invention is further provided with the gear shifting device configured to shift the transmission ratio. The gear shifting device is configured, for example, as a transmission including a plurality of gears, and is coupled with an output shaft of the internal combustion engine and a rotating shaft of the rotary electric machine via a differential mechanism or the like. According to the gear shifting device, the transmission ratio can be changed, as occasion demands, according to a running situation of the hybrid vehicle. It is thus possible to realize more efficient running.

The control apparatus for the hybrid vehicle according to embodiments of the present invention is a control apparatus configured to control such a hybrid vehicle, and can adopt forms of various computer systems or the like, such as various controllers or microcomputer apparatuses, and various processing units like a single or a plurality of electronic control units (ECUs), which can include, if necessary, for example, one or a plurality of central processing units (CPUs), micro processing units (MPUs), various processors or various controllers, and various storing devices, such as a read only memory (ROM), a random access memory (RAM), a buffer memory, and a flash memory.

During running of the hybrid vehicle of embodiments of the present invention, if there is an output reduction request for the internal combustion engine, the output of the internal combustion engine is maintained at the predetermined value or more, by the first charge controlling device. The "predetermined value" herein is set as a value corresponding to an output value that can suppress occurrence of a disadvantage caused by a reduction in the output of the internal combustion engine (e.g. a misfire in the internal combustion engine). Thus, if there is an output reduction request relatively significant enough to cause this disadvantage, the output reduction request is not reflected as it is, and the output of the internal combustion engine is maintained at a value that does not cause the disadvantage. On the other hand, if there is the output reduction request relatively less significant so that the disadvantage is not caused, the output of the internal combustion engine does not have to be maintained (i.e. the output of the internal combustion engine may be reduced in accordance with the output reduction request).

The maintenance of the output of the internal combustion engine at the predetermined value or more causes the output excess with respect to the originally required output. The output excess is used to charge the power storing device by the first charge controlling device. Specifically, the output excess of the internal combustion engine is converted to electric power by the regeneration of the rotary electric machine, and is used to charge the power storing device.

Moreover, during running of the hybrid vehicle according to embodiments of the present invention, if there is the upshift request for the gear shifting device, the output increment occurs in association with a change in inertia torque. The output increment is used to charge the power storing device by the second charge controlling device. Specifically, the output increment caused by the upshift is converted to electric power by the regeneration of the rotary electric machine, and is used to charge the power storing device, as in the output excess of the internal combustion engine described above.

As described above, the output excess when there is the output reduction request for the internal combustion engine and the output increment when there is the upshift request for the gear shifting device are used to charge the power storing device as regenerative power. The regenerative power is kept at a relatively small value if either one of the output reduction request and the upshift request is generated. If, however, the control time of the output reduction request overlaps the control time of the upshift request, the respective regenerative powers corresponding to both requests are summed and can have a relatively large value.

Here, particularly in embodiments of the present invention, if the control time of the output reduction request overlaps the control time of the upshift request, the execution time of the upshift is extended, or the start timing of the upshift is delayed by the transmission time changing device, in comparison with the case where the control time of the output reduction request does not overlap the control time of the upshift request. Specifically, the transmission time changing device extends or delays the execution time of the upshift, in order to prevent the charge power for the power storing device from exceeding the input limit value. The "input limit value" herein is a limit value of the charge power set in advance for the power storing device, and is set, for example, in order to suppress deterioration of the power storing device. The expression, "the control time of the output reduction request overlaps the control time of the upshift request", means a situation in which the control times of the output reduction request and the upshift request overlap each other significantly enough to cause a sum value of the regenerative powers to exceed the input limit value. Thus, for example, if the control times of the output reduction request and the upshift request overlap only slightly, and if there is little possibility that the sum value of the regenerative powers exceeds the input limit value, then, it does not have to be determined that the "control times overlap".

The extension of the execution time of the upshift reduces regenerative power per unit time obtained by the upshift. Specifically, a delayed change in number of revolutions according to the transmission stages of the internal combustion engine and the rotary electric machine reduces inertia torque (i.e. inertia of a rotary body×acceleration), which results in a reduction in the regenerative power. It is thus possible to certainly reduce the charge power for the power storing device. Moreover, the delayed start timing of the upshift can delay timing at which the regenerative power is generated by the upshift. It is thus possible to eliminate or reduce an overlap period with the output reduction request for the internal combustion engine, thereby certainly reducing the charge power for the power storing device. As a result, it is possible to avoid that the regenerative power used to charge the power storing device (i.e. the sum value of the regenerative power according to the output excess associated with the output reduction request and the regenerative power according to the output increment associated with the upshift request) exceeds the input limit value. The extension or delay of the execution time of the upshift is preferably performed in a range that does not cause a new disadvantage. In other words, it is not preferable to extremely extend or delay the execution time of the upshift, and the change is preferably in a range as small as possible.

As a result, according to the control apparatus for the hybrid vehicle of embodiments of the present invention, it is possible to avoid the disadvantage caused where the power storing device is charged over the input limit value (i.e. the deterioration of the power storing device, etc.). It is also possible to prevent the disadvantage caused where the charge power is forcibly suppressed (e.g. a reduction in drivability caused by unexpected driving force variation or the like, etc.) even though it is required to perform the charging over the input limit value.

It is preferable that the charge power for the power storing device completely remains at or below the input limit value due to the extension or delay of the execution time of the upshift; however, even if the charge power for the power storing device does not remain at or below the input limit value, the aforementioned effect can be properly obtained. In other words, even if the charge power for the power storing device only approaches (or is reduced, to a greater or lesser degree, to) the input limit value, the effect of suppressing the occurrence of the disadvantage described above can be properly demonstrated.

<2>

In one aspect of the control apparatus for the hybrid vehicle according to embodiments of the present invention, the transmission time changing device delays the start timing of the upshift if the extended execution time of the upshift exceeds a predetermined time.

In this case, the transmission time changing device firstly reduces the regenerative power by extending the execution time of the upshift, in order to set the charge power for the power storing device to be at or below the input limit value. If, however, the execution time of the upshift after the extension is too long, there is a possibility of the occurrence of the disadvantage, such as a reduction in fuel efficiency and a reduction in drivability. In other words, even if the reduction in regenerative power can be realized, there is a possibility of the occurrence of a new disadvantage.

Thus, the transmission time changing device performs a process of delaying the start timing of the upshift, instead of extending the execution time of the upshift, if the execution time of the upshift after the extension exceeds the predetermined time. The "predetermined time" is a threshold value for determining whether or not the execution time of the upshift is long enough to cause the disadvantage described above, and for example, the predetermined time can be experimentally obtained in advance.

As described above, even if the change in the execution time of the upshift causes a too long execution time of the upshift as a result of the extension, it is possible to certainly reduce the charge power for the power storing device while preventing the occurrence of the disadvantage, by delaying the start timing of the upshift.

<3>

In another aspect of the control apparatus for the hybrid vehicle according to embodiments of the present invention, the control apparatus further includes a misfire predicting device configured to predict a misfire in the internal combustion engine, and the first charge controlling device maintains the output of the internal combustion engine at the predetermined value or more if the misfire in the internal combustion engine is predicted, and charges the power storing device with the output excess.

According to this aspect, the misfire in the internal combustion engine is predicted by the misfire predicting device. The misfire predicting device predicts whether or not the misfire occurs, for example, on the basis of the output reduction request of the internal combustion engine. More specifically, the misfire predicting device predicts whether or not the misfire occurs, by comparing a load of the internal combustion engine before the output reduction with a load of the internal combustion engine after the output reduction.

If the misfire is predicted by the misfire predicting device, such control that the output of the internal combustion engine is maintained at the predetermined value or more is performed by the first charge controlling device, and the power storing device is charged with the output excess. This makes it possible to efficiently use energy of the output excess for the charging while certainly preventing the misfire in the internal combustion engine. If the misfire is not predicted even if there is the output reduction request, the output of the internal combustion engine does not have to be maintained at the predetermined value or more.

<4>

In the aspect in which the misfire predicting device is provided, the hybrid vehicle further includes a recirculating device configured to recirculate a part of emission gas from the internal combustion engine to an intake side, and the misfire predicting device predicts a misfired caused by the emission gas from the internal combustion engine that is recirculated by the recirculating device.

In the internal combustion engine provided with the recirculating device (EGR: exhaust gas recirculation), there is a possibility of the occurrence of the misfire due to an influence of a residual EGR gas. Thus, the misfire predicting device according to this aspect predicts the misfire caused by the emission gas (or EGR gas) recirculated by the recirculating device.

Specifically, the misfire predicting device predicts the misfire in the internal combustion engine on the basis of parameters regarding the EGR gas remaining in the internal combustion engine. For example, the misfire predicting device predicts the misfire on the basis of an EGR ratio (i.e. a ratio of the emission gas recirculated by the recirculating device), a volume of the residual EGR gas, or the like. The misfire in the internal combustion engine provided with the recirculating device can be accurately predicted by using the various parameters regarding the EGR, as described above.

The nature, utility, and further features of this invention will be more clearly apparent from the following detailed description with reference to a preferred embodiment of the invention when read in conjunction with the accompanying drawings briefly described below.

BRIEF DESCRIPTION OF THE DRAWINGS

FIG. 4 is an operation engagement table of a transmission of the hybrid vehicle according to the embodiment;

FIG. 13 is version 2 of a time chart illustrating variations of various parameters during control by the control apparatus for the hybrid vehicle according to the embodiment.

DETAILED DESCRIPTION OF THE PREFERRED EMBODIMENT

Hereinafter, a control apparatus for a hybrid vehicle according to an embodiment of the present invention will be explained with reference to the drawings.

<Entire Configuration of Hybrid Vehicle>

Figure 1:
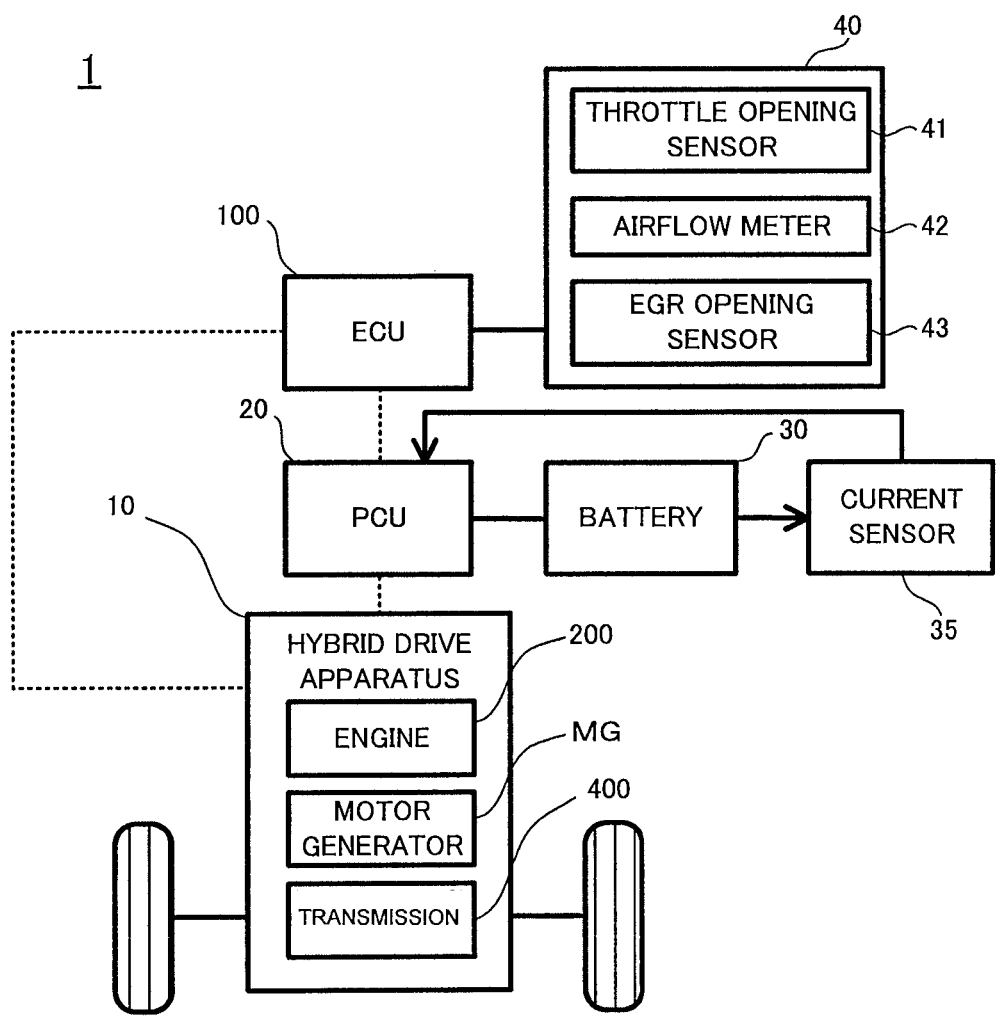
FIG. 1 is a schematic block diagram illustrating an entire configuration of a hybrid vehicle according to an embodiment.

Firstly, with reference to FIG. 1, a configuration of a hybrid vehicle 1 according to the embodiment will be explained. FIG. 1 is a schematic block diagram illustrating an entire configuration of the hybrid vehicle according to the embodiment.

In FIG. 1, the hybrid vehicle 1 according to the embodiment is provided with an electronic control unit (ECU) 100, a hybrid drive apparatus 10, a power control unit (PCU) 20, a battery 30, a current sensor 35, and a sensor group 40.

The ECU 100 is an electronic control unit, which is provided with a central processing unit (CPU), a read only memory (ROM), a random access memory (RAM), and the like, and which is configured to control the operation of each of units of the hybrid vehicle 1. The ECU 100 is one example of the "control apparatus for the hybrid vehicle" according to embodiments of the present invention.

The PCU 20 is a power control unit configured to control input/output of electric power between the battery 30 and a motor generator MG described later. The PCU 20 includes:

a system main relay (SMR) configured to block or cut off electrical connection between the battery 30 and an electric power load; a boost converter configured to boost output voltage of the battery 30 to boost command voltage suitable for the driving of each motor generator MG; and an inverter configured to convert direct current (DC) power extracted from the battery 30 to alternating current (AC) power and supply it to the motor generator described later and configured to convert AC power generated by the motor generator MG to DC power and supply it to the battery 30; and the like (all of which are not specifically illustrated in FIG. 1).

The PCU 20 is electrically connected to the ECU 100, and the operation thereof is controlled by the ECU 100.

The battery 30 is a secondary battery unit, which functions as an electric power supply associated with electric power for power running of the motor generator MG, or which can store therein electric power obtained by regeneration of the motor generator MG. The battery 30 is configured in such a manner that a plurality of unit battery cells, such as, for example, lithium ion battery cells, are connected in series. The battery 30 is one example of the "power storing device" according to embodiments of the present invention, and an input limit value Win for suppressing deterioration or the like is set for the battery 30. A current value of the battery 30 is detected by the current sensor 35. The battery 30 detected by the current sensor 35 is outputted to the PCU, and is used to calculate a SOC.

The sensor group 40 is a general term of various sensors configured to detect states of the hybrid vehicle 1. FIG. 1 illustrates a throttle opening sensor 41, an airflow meter 42, and an EGR opening sensor 43, as the various sensors that constitute the sensor group 40.

The throttle opening sensor 41 is a sensor configured to detect a throttle valve opening degree of an engine 200. The throttle opening sensor 41 is electrically connected to the ECU 100, and the detected throttle valve opening degree is referred to by the ECU 100, as occasion demands.

The airflow meter 42 is a sensor configured to detect an intake air amount of the engine from the exterior. The airflow meter 42 is electrically connected to the ECU 100, and the detected intake air amount is referred to by the ECU 100, as occasion demands.

The EGR opening sensor 43 is a sensor configured to detect an EGR valve opening degree in an EGR system described later. The EGR opening sensor 43 is electrically connected to the ECU 100, and the detected EGR valve opening degree is referred to by the ECU 100, as occasion demands.

The hybrid drive apparatus 10 is a power train of the hybrid vehicle 1, and is provided with the engine 200 and the motor generator MG. A specific configuration of the hybrid drive apparatus 10 will be detailed below.

<Configuration of Hybrid Drive Apparatus>

Figure 2:
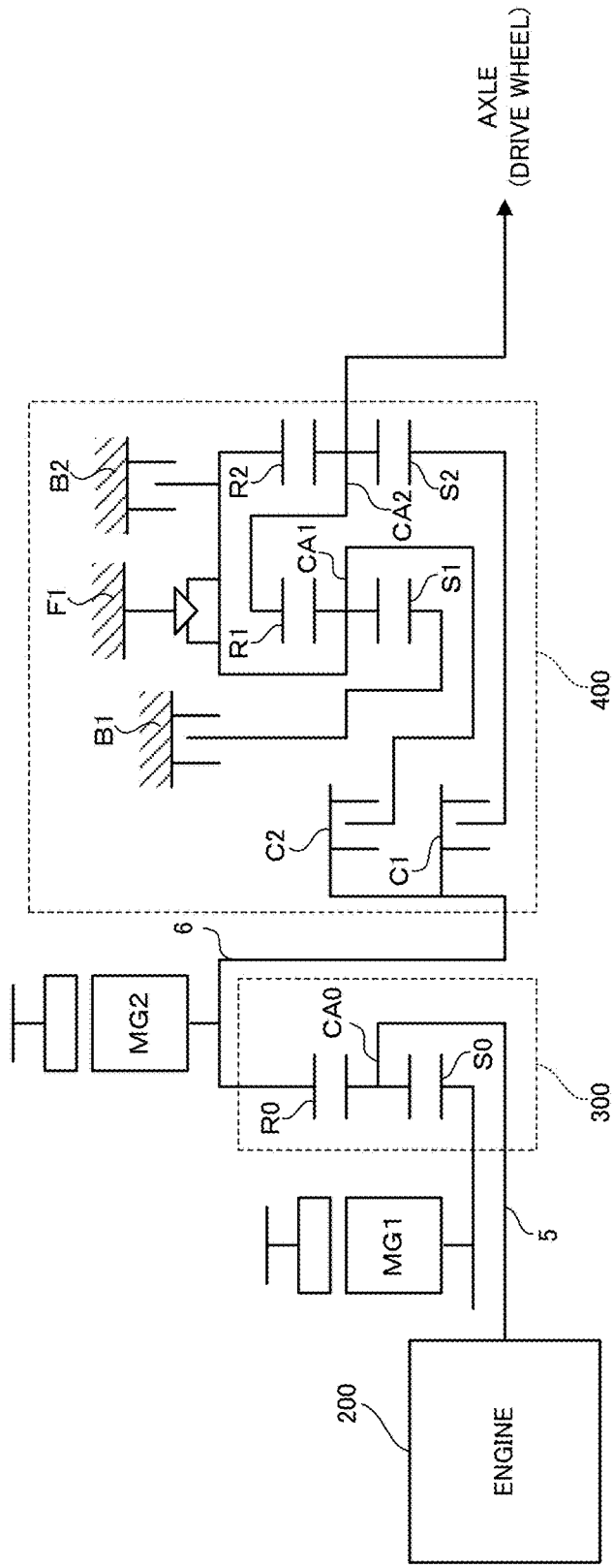
FIG. 2 is a schematic illustrating a configuration of a hybrid drive apparatus according to the embodiment.

Next, with reference to FIG. 2, a configuration of the hybrid drive apparatus 10 according to the embodiment will be explained. FIG. 2 is a skeleton illustrating the configuration of the hybrid drive apparatus according to the embodiment.

As illustrated in FIG. 2, the hybrid drive apparatus 10 according to the embodiment is provided with the engine 200, a motor generator MG1, and a motor generator MG2, as a power source for running of the hybrid vehicle 1.

The engine 200 is a gasoline engine, which functions as a main power source of the hybrid vehicle 1 and which is one example of the "internal combustion engine" according to embodiments of the present invention.

Each of the motor generators MG1 and MG2 is an electric motor generator, which has a power running function for converting electrical energy to kinetic energy and a regeneration function for converting kinetic energy to electrical energy, and which is one example of the "rotary electric machine" according to embodiments of the present invention. Each of the motor generators MG1 and MG2 is an electric motor generator that is provided with a rotor(s) having a plurality of permanent magnets on an outer circumferential surface, and a stator around which a three-phase coil for forming a rotating magnetic field is wound. The motor generators MG1 and MG2, however, may have another configuration.

The engine 200 and the motor generators MG1 and MG2 are coupled with each other via a planetary gear mechanism 300 of a single pinion type. The planetary gear mechanism 300 has: a sun gear S0, which is an external tooth gear; a ring gear R0, which is an internal tooth gear placed coaxially with the sun gear S0; and a carrier CA0 for holding pinions, which engage with the sun gear S0 and the ring gear R0, in a rotatable and revolvable manner.

An engine output shaft 5, which is an output shaft of the engine 200, is coupled with the carrier CA0 of the planetary gear mechanism 300, and the engine output shaft 5 rotates integrally with a carrier CA1. Thus, engine torque outputted by the engine 200 is transmitted to the carrier CA1. The motor generator MG1 is coupled with the sun gear S0 of the planetary gear mechanism 300. The motor generator MG2 is coupled with a drive shaft 6, which is coupled with the ring gear R0 of the planetary gear mechanism 300. Torque outputted from the engine 200 and the motor generators MG1 and MG2 is outputted via the planetary gear mechanism 300 and the drive shaft 6.

The drive shaft 6 is coupled with a transmission 400 configured to change a gear ratio of the hybrid vehicle. The transmission 400 is one example of the "gear shifting device" according to embodiments of the present invention. The transmission 400 is provided with two planetary gear mechanisms (specifically, a planetary gear mechanism provided with a sun gear S1, a ring gear R1, and a carrier CA1, and a planetary gear mechanism provided with a sun gear S2, a ring gear R2, and a carrier CA2), a first clutch C1, a second clutch C2, a one-way clutch F1, a first brake B1, and a second brake B2.

In the two planetary gear mechanisms, the carrier CA1 of one of the two planetary gear mechanisms and the ring gear R2 of the other planetary gear mechanism are coupled with each other. Moreover, the ring gear R1 of one of the two planetary gear mechanisms and the carrier CA2 of the other planetary gear mechanism are coupled with each other.

The first clutch C1 is configured to change a power transmission state between the drive shaft 6 and the sun gear S2. The second clutch C2 is configured to change a power transmission state between the drive shaft 6 and the carrier CA1.

The one-way clutch F1 is configured to transmit power only in a predetermined direction between the carrier CA1 and the ring gear R2.

The first brake is configured to stop the rotation of the sun gear S1. The second brake is configured to stop the rotation of the carrier CA1 and the ring gear R2.

Torque transmitted via the transmission 400 is outputted to an axle side via the carrier CA2.

The configuration of the transmission 400 described above is merely one example. A transmission 400 in a different form may be used as a mechanism that changes the gear ratio of the hybrid vehicle.

<Gear Ratio Realized by Transmitter Transmission>

Figure 3:
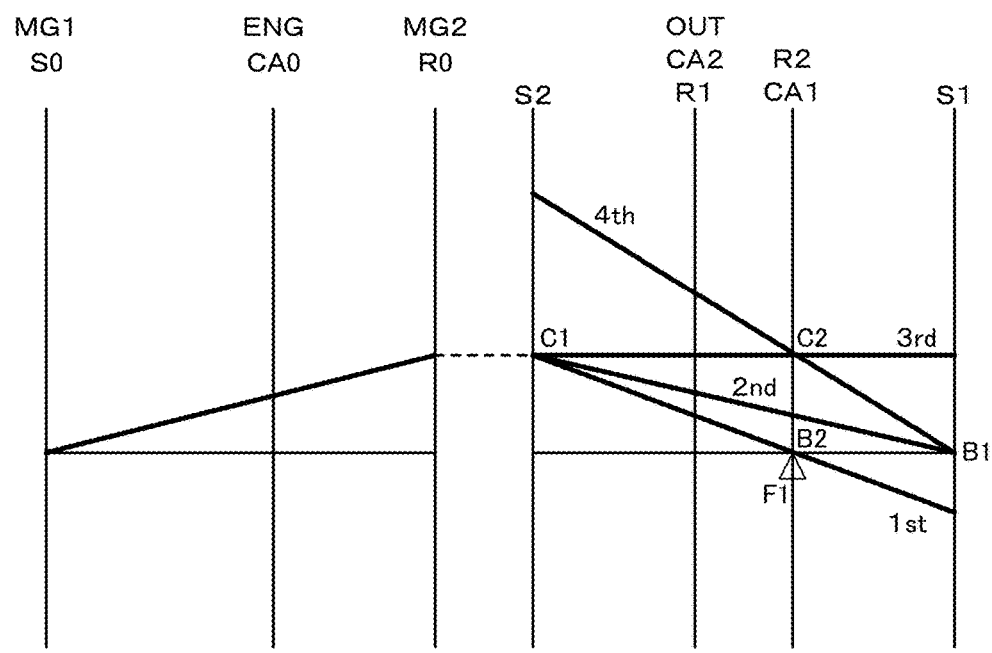
FIG. 3 is a velocity diagram of the hybrid vehicle according to the embodiment.
Figure 4:
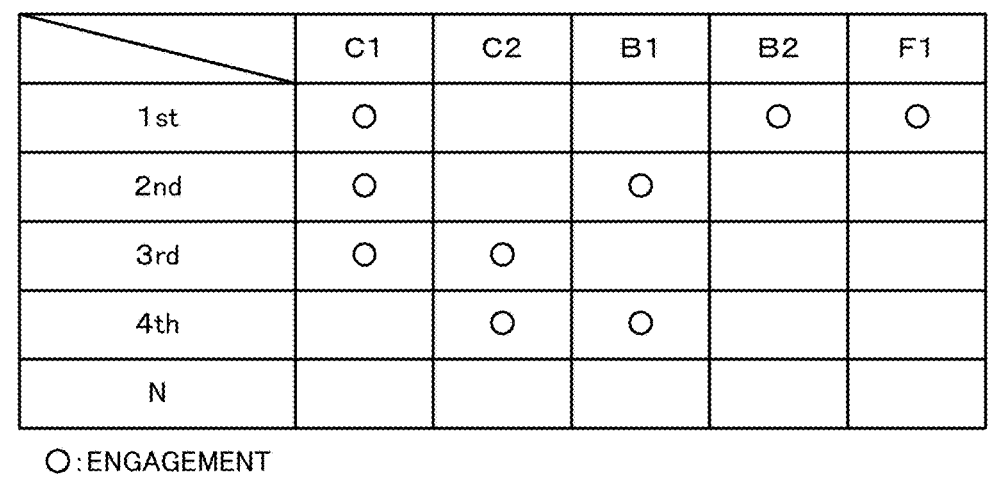
Figure 5:
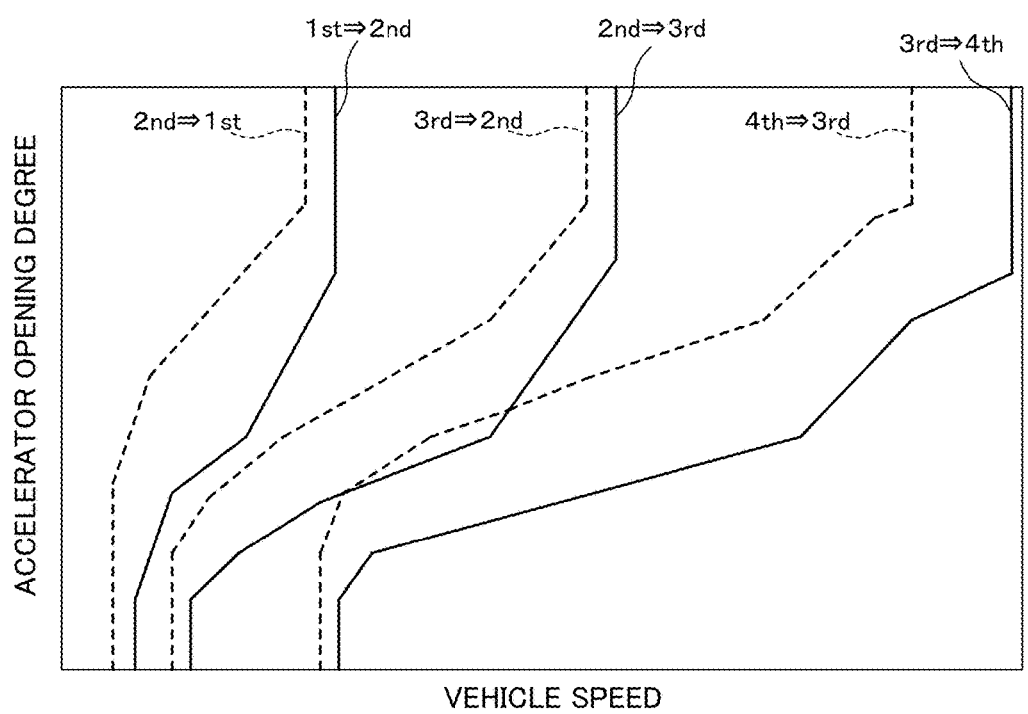
FIG. 5 is a map illustrating gear shift lines of the transmission of the hybrid vehicle according to the embodiment.

Next, with reference to FIG. 3 to FIG. 5, the gear ratio that can be realized by the transmission 400 according to the embodiment will be specifically explained. FIG. 3 is a velocity diagram of the hybrid vehicle according to the embodiment. FIG. 4 is an operation engagement table of the hybrid vehicle according to the embodiment. FIG. 5 is a map illustrating gear shift lines of the hybrid vehicle according to the embodiment. Incidentally, "◯" in FIG. 4 indicates an engagement state, and the other means a disengagement state.

As illustrated in FIG. 3 and FIG. 4, the transmission 400 according to the embodiment can change the gear ratio of the hybrid vehicle 1 at four stages. Specifically, the first clutch C1, the second brake B2, and the one-way clutch F1 are engaged, and the second clutch C2 and the first brake B1 are disengaged, by which a gear ratio 1st, i.e. a highest gear ratio state, is realized. The first clutch C1 and the first brake B1 are engaged, and the second clutch C2, the second brake B2, and the one-way clutch F1 are disengaged, by which a gear ratio 2nd, i.e. a second highest gear ratio state, is realized. The first clutch C1 and the second clutch C2 are engaged, and the first brake B1, the second brake B2, and the one-way clutch F1 are disengaged, by which a gear ratio 3rd, i.e. a third highest gear ratio state, is realized. The second clutch C2 and the first brake B1 are engaged, and the first clutch C1, the second brake B2, and the one-way clutch F1 are disengaged, by which a gear ratio 4th, i.e. a lowest gear ratio state, is realized. All the first clutch C1, the second clutch C2, the first brake B1, the second brake B2, and the one-way clutch F1 are disengaged, by which neutral is realized.

The one-way clutch F1 has a function of preventing reverse rotation of the carrier CA1 and the ring gear R2, thereby improving controllability not by both the first brake B1 and the second brake B2 but only by the first brake B1, during a gear shift from the gear ratio 1st to the gear ratio 2nd. The one-way clutch F1 also has a function for turning on the second brake B2 when engine brake is applied.

As illustrated in FIG. 5, the transmission 400 changes a transmission ratio or a gear shift ratio according to the gear shift lines set in advance. Specifically, if an operating point of the hybrid vehicle 1 changes across a gear shift line, the change in the gear ratio according to the gear shift line is realized.

<Configuration of Engine of Hybrid Vehicle>

Figure 6:
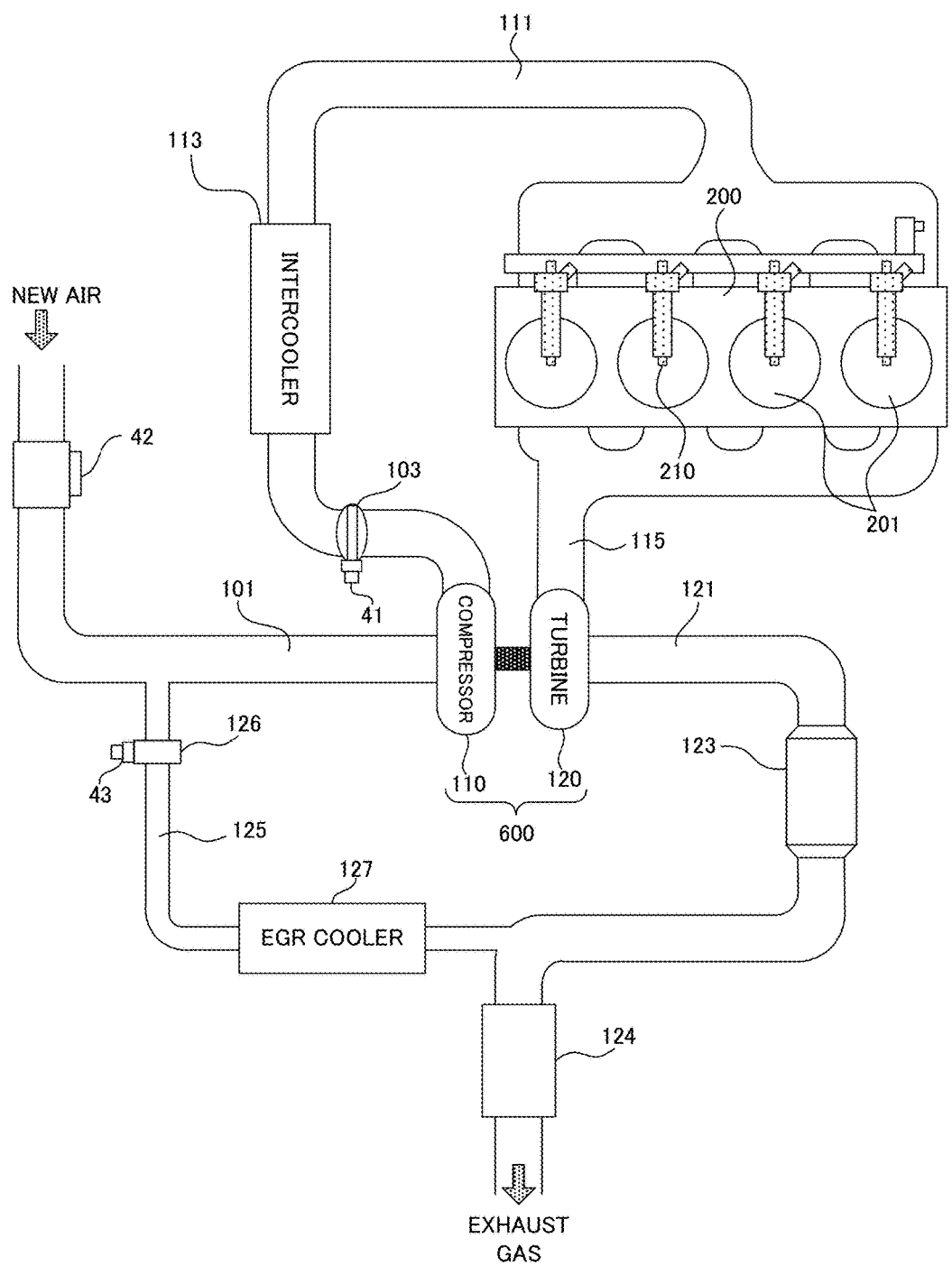
FIG. 6 is a schematic block diagram illustrating a configuration of an internal combustion engine of the hybrid vehicle according to the embodiment.

Next, a configuration in the surroundings of the engine 200 of the hybrid vehicle 1 according to the embodiment will be explained with reference to FIG. 6. FIG. 6 is a schematic block diagram illustrating the configuration of an internal combustion engine of the hybrid vehicle according to the embodiment.

In FIG. 6, the engine 200 according to the embodiment is configured as a supercharging engine, which is provided with a compressor 110 and a turbine 120.

The compressor 110 compresses an air that flows in, and supplies it downstream as a compressed air. The turbine 120 rotates by using, as power, an exhaust gas supplied from the engine 200 via an exhaust tube 115. The turbine 120 is coupled with the compressor 110 via a shaft and is configured to rotate integrally with the compressor 110. In other words, the turbine 120 and the compressor 110 constitute a turbocharger 600.

The engine 200 is, for example, an in-line four cylinder engine in which four cylinders 201 are arranged in series in a cylinder block. Detailed illustration is omitted herein, but the engine 200 is configured to convert reciprocating motion of a piston, which occurs when an air-fuel mixture is burned inside each of the cylinders 201, to rotational motion of a crankshaft via a connecting rod.

In an intake tube 101 on an inlet side of the compressor 110, i.e. on an upstream side of the compressor 110, the airflow meter 42 is provided.

In an intake tube 111 on an outlet side of the compressor 110, i.e. on a downstream side of the compressor 110, and on an intake side of the engine 200, i.e. on a downstream side of the cylinders 201, a throttle valve 103 is provided. The throttle valve 103 is, for example, an electronic control valve, and is configured in such a manner that an opening/closing operation of the throttle valve 103 is controlled by a not-illustrated throttle valve motor. The opening degree of the throttle valve 103 can be detected by the throttle opening sensor 41.

At a later stage of the throttle valve 103, an intercooler 113 is provided. The intercooler 113 is configured to cool an intake air and to increase supercharge efficiency of the air.

In combustion chambers inside the cylinders 201 of the engine 200, the air-fuel mixture is sucked, wherein the air-fuel mixture is obtained by mixing an air supplied via the intake tube 111 and fuel injected from the injector 210. The air-fuel mixture led into each of the cylinders 201 from the intake side is ignited by respective one of spark plugs or the like, which are not illustrated, and an explosive stroke is performed in each of the cylinders 201. If the explosive stroke is performed, the burned air-fuel mixture (containing the air-fuel mixture partially unburned) is emitted to each of exhaust ports, which are not illustrated, in an exhaust stroke following the explosive stroke. The exhaust gas emitted to the exhaust port is led to the exhaust tube 115.

In an exhaust tube 121 on an outlet side of the turbine 120, i.e. on a downstream side of the turbine 120, there is provided an EGR system, which is provided with a first catalyst 123, a second catalyst 124, an EGR tube 125, an EGR valve 126, and an EGR cooler 127. The EGR system is one example of the "recirculating device" according to embodiments of the present invention.

The first catalyst 123 contains, for example, an oxidation catalyst, and purifies a material contained in the exhaust gas that passes through the turbine 120.

The second catalyst 124 is provided on a downstream side of the first catalyst 123 of the exhaust tube 122, and purifies a material contained in the exhaust gas.

The EGR tube 125 is configured to recirculate the exhaust gas on the downstream side of the first catalyst 123, to the intake tube 101 on the inlet side of the compressor 110. The EGR valve 126 is provided on the EGR tube 125, and can adjust the amount of an EGR gas. The EGR cooler 127 configured to cool the EGR gas to be recirculated is provided on the EGR tube 125. The opening degree of the EGR valve 126 can be detected by an EGR opening sensor 44.

<Configuration of Control Apparatus for Hybrid Vehicle>

Figure 7:
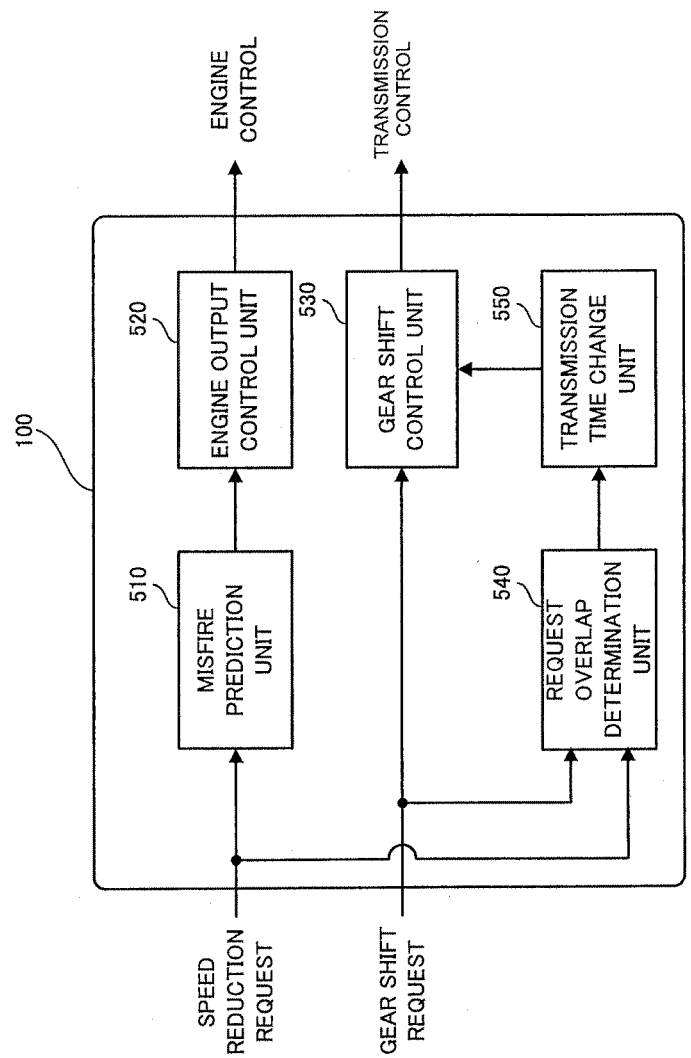
FIG. 7 is a block diagram illustrating a configuration of a control apparatus for a hybrid vehicle according to the embodiment.

Next, with reference to FIG. 7, a configuration of a control apparatus for a hybrid vehicle according to the embodiment will be explained. FIG. 7 is a block diagram illustrating the configuration of the control apparatus for the hybrid vehicle according to the embodiment.

In FIG. 7, a main part of the control apparatus for the hybrid vehicle according to the embodiment is configured as the ECU 100. The ECU 100 is at least provided with a misfire prediction unit 510, an engine output control unit 520, a gear shift control unit 530, a request overlap determination unit 540, and a transmission time change unit 550.

The misfire prediction unit 510 is one example of the "misfire predicting device" according to embodiments of the present invention, and predicts a misfire in the engine 200.

The misfire prediction unit 510 predicts the misfire if it is required to reduce the speed, i.e. if there is a speed reduction request, for the hybrid vehicle 1. The misfire prediction unit 510 predicts the misfire, for example, on the basis of a variation in load of the engine 200, an EGR gas amount that remains inside the engine 200, or the like. The misfire to be predicted is a misfire that transiently occurs for the following reason; namely, the EGR gas remains at high concentrations between the throttle valve 103 and the EGR valve 126 in the case of a high load by closing both the throttle valve 103 and the EGR valve 126, and the residual EGR gas flows into the combustion chamber of the engine 200 after an air amount decreases, so that an EGR concentration in the combustion chamber increases (specifically, a substantial EGR ratio exceeds a limit EGR ratio). Thus, the misfire can be predicted, for example, by using the intake air amount and the EGR ratio before speed reduction, the intake air amount and the limit EGR ratio after the speed reduction, and a volume of the residual EGR gas. A prediction result of the misfire prediction unit 510 can be outputted to the engine output control unit 520.

The engine output control unit 520 controls the output of the engine 200 on the basis of the prediction result of the misfire prediction unit 510. If the misfire in the engine 200 is predicted, the engine output control unit 520 controls the output of the engine 200 to be maintained at a predetermined value or more. In the embodiment, an output excess caused by the maintenance of the engine output is regenerated by the motor generator MG2 or the like, and is used to charge the battery 30. In this manner, the engine output control unit 520 functions as a part of the "first charge controlling device" according to embodiments of the present invention.

The gear shift control unit 530 is one example of the "second charge controlling device" according to the present invention. The gear shift control unit 530 controls the transmission 400 to change the transmission ratio if it is required to perform gear shift, i.e. if there is a gear shift request. Moreover, in particular, the gear shift control unit 530 according to the embodiment can change a transmission time or a gear shift time during upshift, in accordance with a command from the transmission time change unit 550. Specifically, the gear shift control unit 530 can extend a time required for the gear shift, or can delay gear shift start timing or transmission start timing. During the upshift of the transmission 400, there is an output increment associated with a change in inertia torque. The output increment is regenerated by the motor generator MG2 or the like, and is used to charge the battery 30. In this manner, the gear shift control unit 530 functions as a part of the "second charge controlling device" according to embodiments of the present invention.

The request overlap determination unit 540 determines whether or not a control time of a speed reduction request overlaps a control time of a upshift request, in the hybrid vehicle. A determination result of the request overlap determination unit 540 can be outputted to the transmission time change unit 550.

If it is determined that the control time of the speed reduction request overlaps the control time the upshift request, the transmission time change unit 550 gives a command to change the transmission time to the gear shift control unit 530. A specific method of changing the transmission time will be detailed later.

<Engine Output Maintaining Control>

Figure 8:
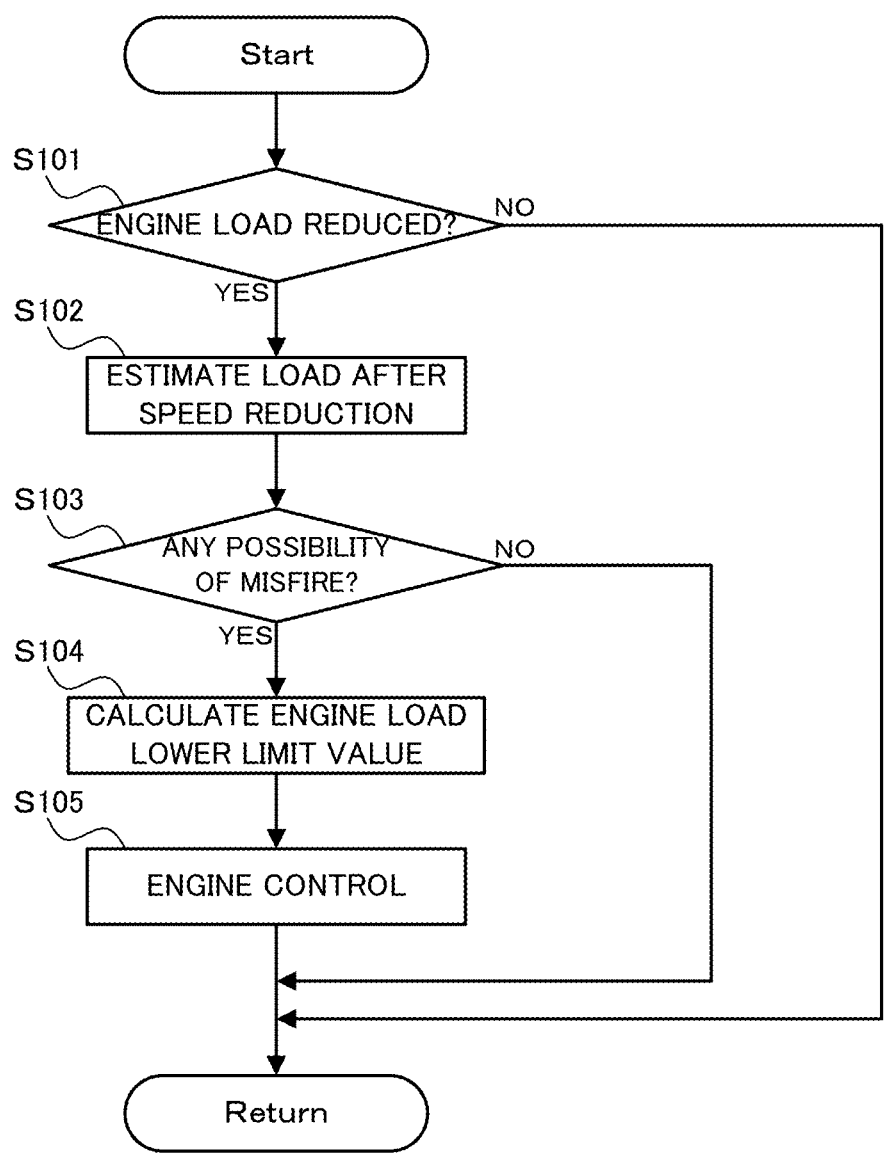
FIG. 8 is a flowchart illustrating a flow of engine output maintaining control by the control apparatus for the hybrid vehicle according to the embodiment.

Next, with reference to FIG. 8, an explanation will be given to engine output maintaining control, i.e. such control that the misfire of the engine 200 is predicted and the output of the engine 200 is maintained at the predetermined value or more, performed by the control apparatus for the hybrid vehicle according to the embodiment. FIG. 8 is a flowchart illustrating a flow of the engine output maintaining control by the control apparatus for the hybrid vehicle according to the embodiment.

In FIG. 8, according to the control apparatus for the hybrid vehicle according to the embodiment, if a reduction in engine load is detected (step S101: NO), a load after the speed reduction is estimated on the misfire prediction unit 510. Specifically, the misfire prediction unit 510 calculates an engine load after the speed reduction, on the basis of a change amount of the throttle opening degree detected by the throttle opening sensor 41.

If the load after the speed reduction is estimated, it is determined by the misfire prediction unit 510 whether or not there is a possibility of a misfire in the engine 200 (step S103). The misfire prediction unit 510 determines the possibility of the misfire, for example, on the basis of the intake air amount and the EGR ratio before the speed reduction, the intake air amount and the limit EGR ratio after the speed reduction, and the volume of the residual EGR gas, or the like, in addition to the calculated load after the speed reduction.

If it is determined that there is the possibility of the misfire (the step S103: YES), an engine load lower limit value (specifically, a lower limit value of the engine output that prevents the misfire from occurring) is calculated by the engine output control unit 520 (step S104). Then, the engine is controlled by the engine output control unit 520 so that the engine load is greater than or equal to the calculated lower limit value (step S105).

According to the engine output maintaining control explained above, the occurrence of the misfire can be prevented even if the engine output is reduced in response to the speed reduction request. The output excess caused by the maintenance of the engine output is converted to electric power by the regeneration, and is used to charge the battery 30. It is thus possible to efficiently use energy generated by the engine 200 without waste.

<Transmission Time Change Control>

Figure 9:
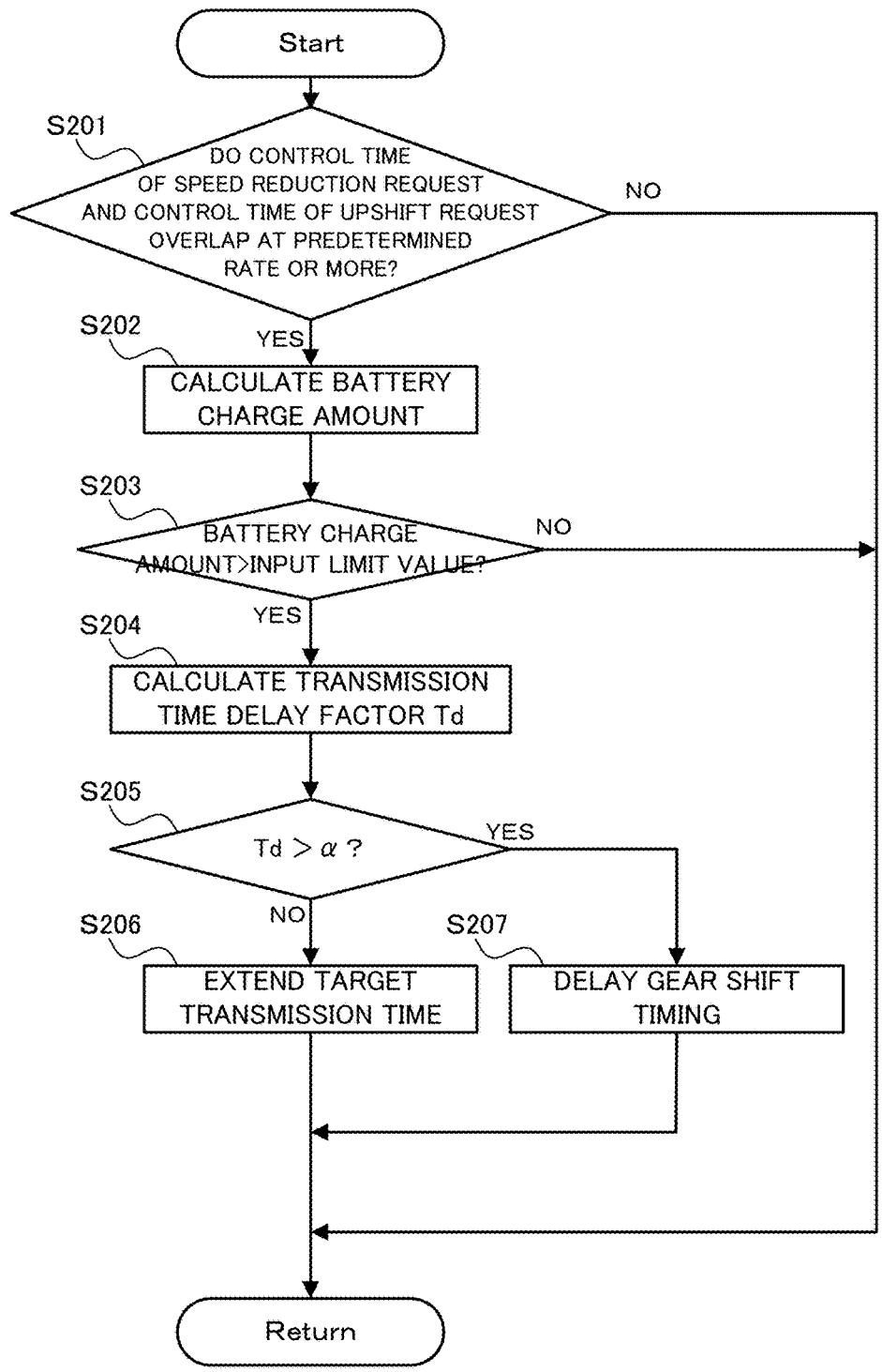
FIG. 9 is a flowchart illustrating a flow of transmission time change control by the control apparatus for the hybrid vehicle according to the embodiment.
Figure 10:
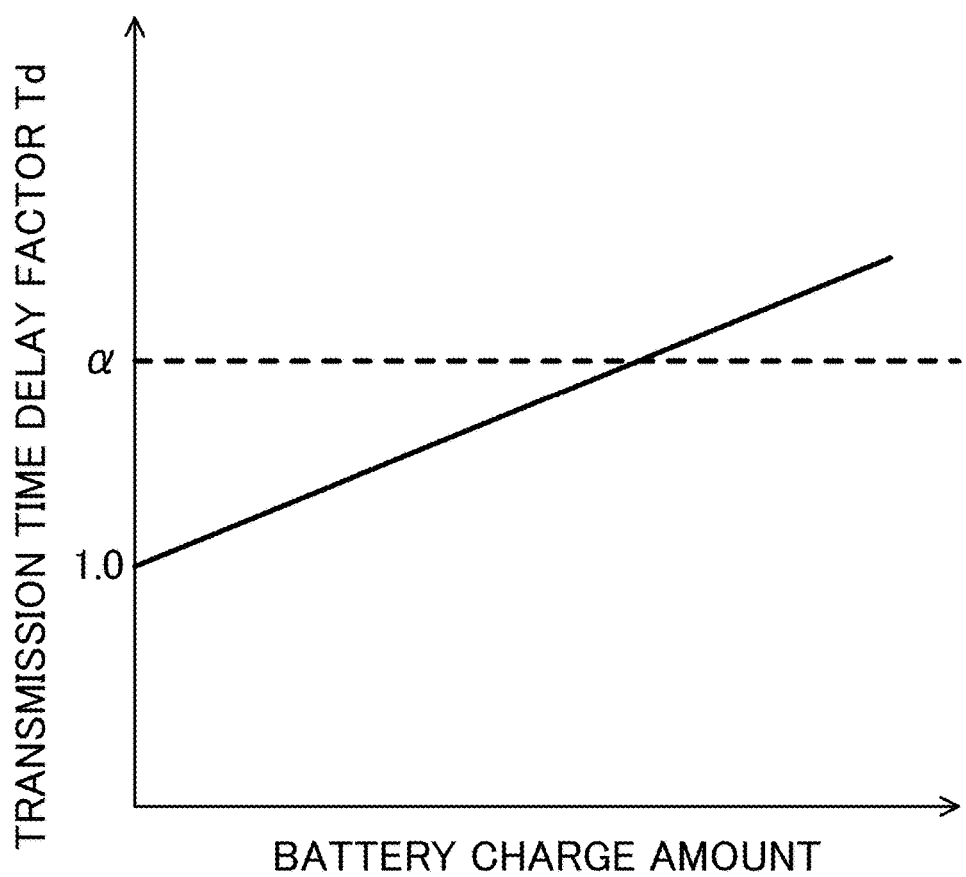
FIG. 10 is a map illustrating a relation between a battery charge amount and a transmission time delay factor.

Next, with reference to FIG. 9 and FIG. 10, an explanation will be given to an upshift time change operation performed by the control apparatus for the hybrid vehicle according to the embodiment. FIG. 9 is a flowchart illustrating a flow of the transmission time change control by the control apparatus for the hybrid vehicle according to the embodiment. FIG. 10 is a map illustrating a relation between a battery charge amount and a transmission time delay factor.

In FIG. 9, on the control apparatus for the hybrid vehicle according to the embodiment, it is monitored on the request overlap determination unit 540 whether or not the control time of the speed reduction request overlaps the control time of the upshift request (step S201).

If it is determined that the control time of the speed reduction request overlaps the control time of the upshift request (step S201: YES), a charge amount of the battery 30 by the regeneration is calculated (step S202). Specifically, calculated is the sum of a charge amount corresponding to the output excess caused by that the engine output is maintained at the predetermined value or more when it is required to reduce the speed, and a charge amount corresponding to the output increment caused during the upshift.

It is determined whether or not the calculated charge amount of the battery 30 exceeds an input limit value Win (step S203). If the charge amount of the battery 30 does not exceed the input limit value Win (the step S203: NO), the subsequent process is omitted. On the other hand, if the charge amount of the battery 30 exceeds the input limit value Win (the step S203: YES), a process for changing the subsequent transmission time is performed.

On the transmission time change unit 550, a transmission time delay factor Td for preventing the charge amount for the battery 30 from exceeding the input limit value Win is calculated (step S204). The transmission time delay factor Td is a factor for determining an extension amount of the transmission time during the upshift of the transmission 400. The transmission time delay factor Td is calculated, for example, as a value that is greater than or equal to 1. The transmission after the extension is calculated by multiplying the transmission time in the normal case by the transmission time delay factor Td.

As illustrated in FIG. 10, the transmission time delay factor Td is calculated as a value that increases as the charge amount for the battery 30 increases. In other words, as the charge amount for the battery 30 increases, the transmission time during the upshift is further extended.

Back in FIG. 9, on the transmission time change unit 550, it is determined whether or not the calculated transmission time delay factor Td is greater than a predetermined threshold value α (step S205). The threshold value α is a threshold value for determining whether or not an upshift execution time after the extension becomes long enough to cause a disadvantage, such as a reduction in fuel efficiency and a reduction in drivability. The threshold value α is determined by performing such a simulation that the transmission time is actually extended, or similar actions.

Here, if it is determined that the transmission time delay factor Td is less than or equal to the threshold value α (the step S205: NO), the transmission time is extended according to the transmission time delay factor Td (step S206). In other words, it is determined that there is no disadvantage even if the transmission time is extended, and it takes more time to perform the upshift. The extension of the upshift execution time can reduce regenerative power per unit time obtained by the upshift. If the upshift extension time is extended, a change is delayed in number of revolutions according to the transmission stage of the MG1 and the engine 200 during the gear shift. Due to the delayed change in the number of revolutions of the MG1 and the engine 200, inertia torque (i.e. inertia of a rotary body×acceleration) is reduced, and as a result, the regenerative power is reduced. It is thus possible to certainly reduce charge power for the battery 30.

On the other hand, if it is determined that the transmission time delay factor Td is greater than the threshold value α (the step S205: YES), the gear shift timing is delayed (step S207). In other words, it is determined that the extension of the transmission causes the disadvantage, and the transmission time is not extended, but the gear shift start timing is delayed. The delay of upshift start timing can delay timing at which the regenerative power is generated by the upshift. It is thus possible to eliminate or reduce a period in which there are both the regenerative power associated with the maintenance of the output of the engine 200 and the regenerative power associated with the upshift, thereby certainly reducing the charge power for the battery 30.

As describe above, if the extension or delay of the transmission time is selected according to the transmission time delay factor Td, the charge power for the battery 30 can be certainly reduced even if the extension of the transmission newly causes the disadvantage.

<Specific Operation and Effect>

Figure 11:
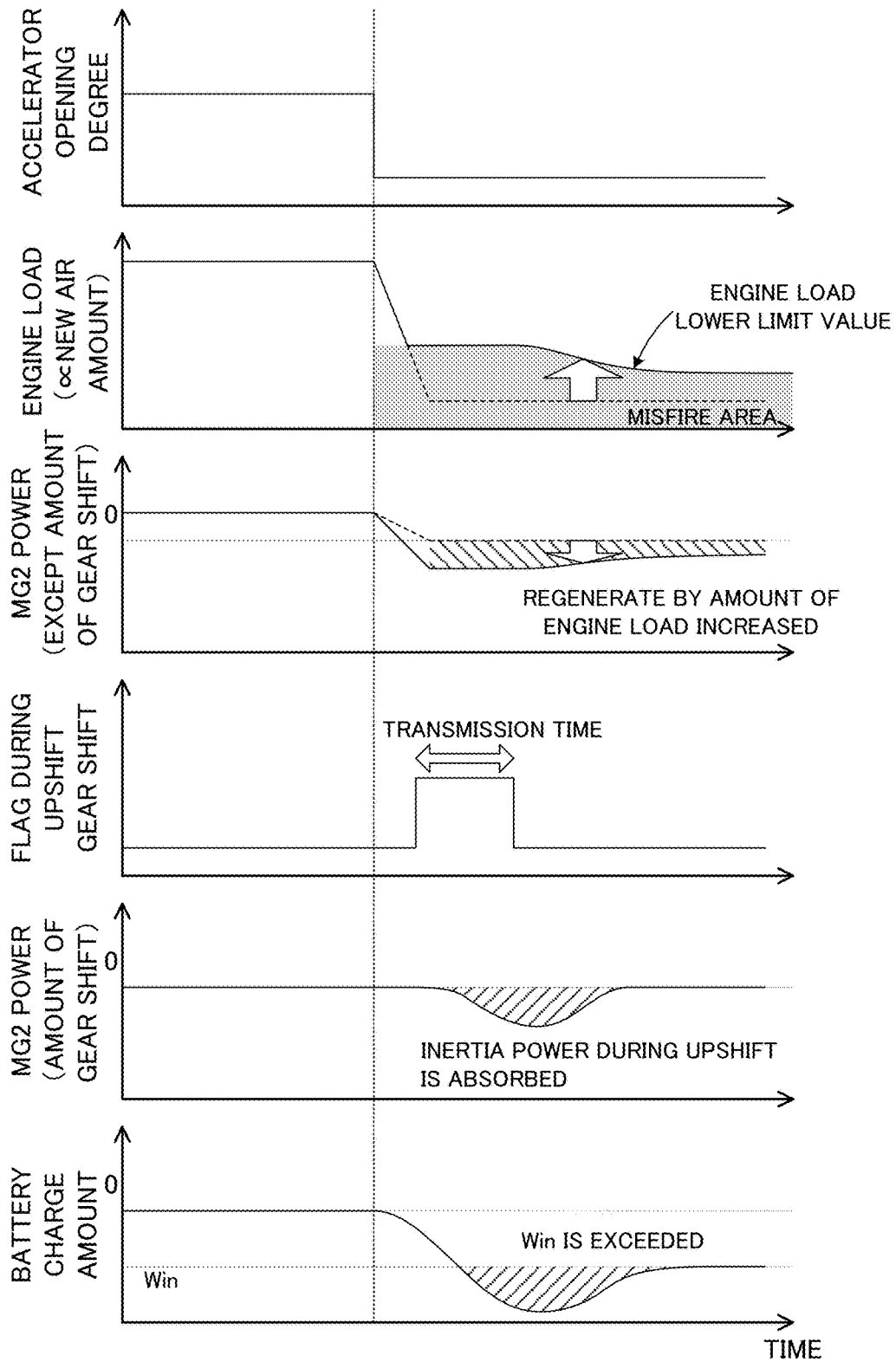
FIG. 11 is a time chart illustrating variations of various parameters during control by a control apparatus for a hybrid vehicle according to a comparative example.
Figure 12:
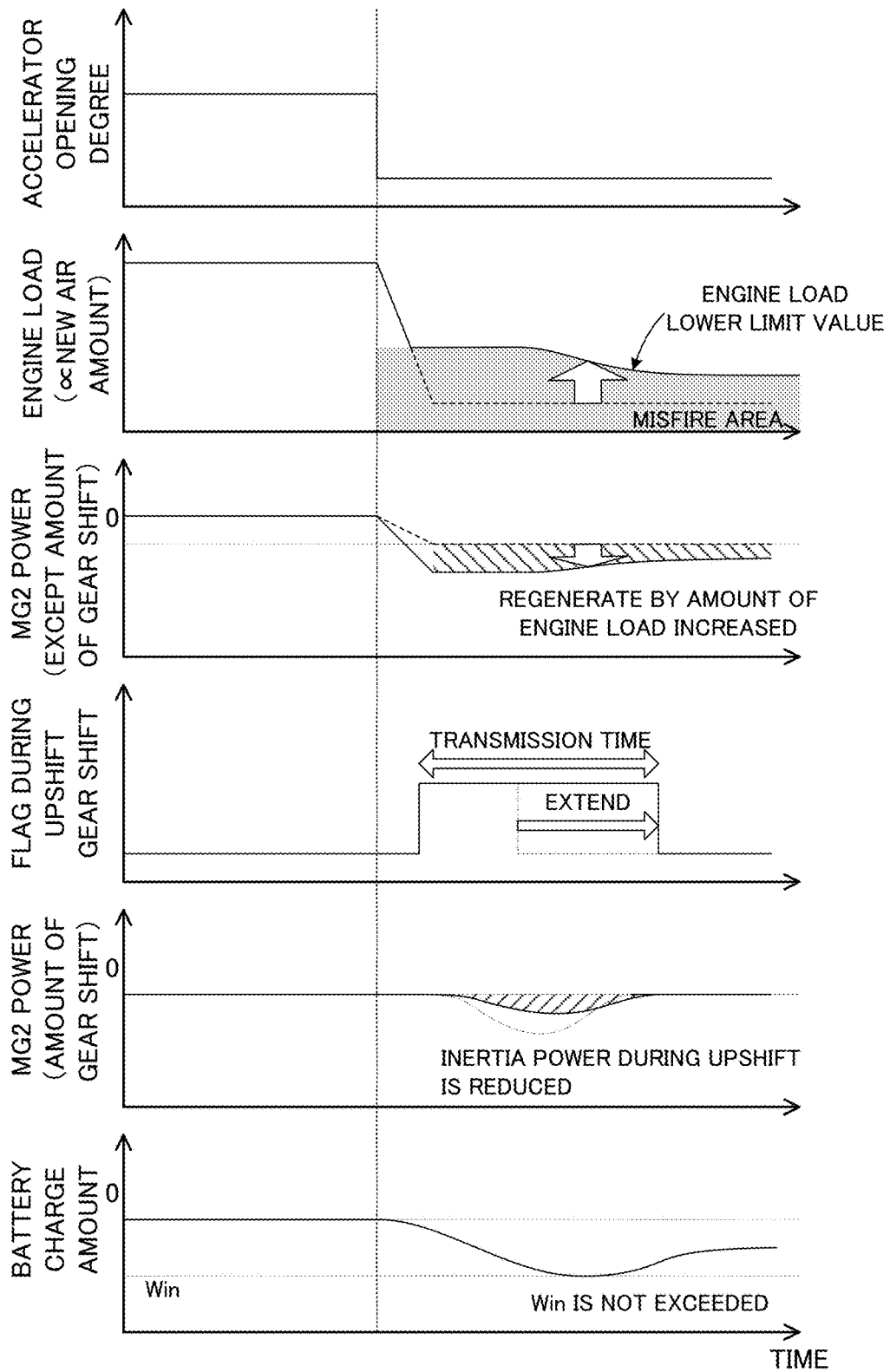
FIG. 12 is version 1 of a time chart illustrating variations of various parameters during control by the control apparatus for the hybrid vehicle according to the embodiment.

Next, with reference to FIG. 11 to FIG. 13, an effect by the transmission time change control described above will be explained, more specifically. FIG. 11 is a time chart illustrating variations of various parameters during control by a control apparatus for a hybrid vehicle according to a comparative example. FIG. 12 is a time chart (ver. 1) illustrating variations of various parameters during control by the control apparatus for the hybrid vehicle according to the embodiment. FIG. 13 is a time chart (ver. 2) illustrating variations of various parameters during control by the control apparatus for the hybrid vehicle according to the embodiment.

In FIG. 11, considered is a comparative example in which the transmission time cannot be changed. In this case, if there is a speed reduction request that allows the engine load to reach a misfire area, the engine output is maintained so that the engine load does not become less than or equal to the lower limit value. As a result, the regenerative power increases by the output excess caused by the maintenance of the engine output.

On the other hand, if the upshift is performed in response to the upshift request, the regeneration is performed to absorb the amount of a variation in inertia power. In other words, the regenerative power increases due to the upshift.

Here, if the control time of the speed reduction request overlaps the control time of the upshift request, it is required to charge the battery 30 with the regenerative power associated with the maintenance of the output of the engine 200 and the regenerative power associated with the upshift. Then, the charge amount for the battery 30 becomes extremely large, and exceeds the input limit value Win.

If the batter charge amount exceeds the input limit value Win, for example, the deterioration of the battery 30 is accelerated. Moreover, if the charge power is forcibly suppressed even if it is required to charge over the input limit value Win, for example, unexpected driving force variation or the like causes the reduction in drivability or the like.

In FIG. 12, in the control apparatus for the hybrid vehicle according to the embodiment, as explained above, the transmission time is extended if the control time of the speed reduction request overlaps the control time of the upshift request. This reduces the regenerative power per unit time generated in association with the upshift. It is thus possible to avoid that the charge amount for the battery 30 exceeds the input limit value Win.

In FIG. 13, in the control apparatus for the hybrid vehicle according to the embodiment, moreover, the gear shift start timing is delayed in a situation that the extension of the transmission time causes the disadvantage. This also delays the timing at which the regenerative power is generated in association with the upshift. It is thus possible to eliminate or reduce the period in which there are both the regenerative power associated with the maintenance of the output of the engine 200 and the regenerative power associated with the upshift, thereby avoiding that the charge amount for the battery 30 exceeds the input limit value Win.

Regarding the engine load after the throttle valve 103 is closed, both the misfire area and the engine load lower limit value are reduced due to the EGR valve 126 being closed and a ratio of the EGR gas in the combustion chamber being reduced. Thus, if the gear shift start timing is delayed, the gear shift is performed after the engine output is reduced. It is therefore possible to avoid the charge amount for the battery 30 exceeding the input limit value Win.

As explained above, according to the control apparatus for the hybrid vehicle in the embodiment, even if the control time of the speed reduction request overlaps the control time of the upshift request, it is possible to preferably perform the regeneration while avoiding the disadvantage.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A control apparatus for a hybrid vehicle wherein the hybrid vehicle includes a power supply including an internal combustion engine, a transmission, and a rotary electric machine; a power storing device configured to perform charging by regeneration on the rotary electric machine; and a gear shifting device configured to change a transmission ratio of the transmission, said control apparatus comprising:
    a first charge controlling device configured to maintain output of the internal combustion engine at at least a predetermined value when there is an output reduction request for the internal combustion engine, and to charge the power storing device with an output excess of the predetermined value with respect to an output request for the internal combustion engine;
    a second charge controlling device configured to charge the power storing device with an output increment caused by upshift of the gear shifting device when there is an upshift request for the gear shifting device; and
    a transmission time changing device configured to at least one of extend an execution time of the upshift and delay start timing of the upshift, in order to prevent charge power for the power storing device from exceeding an input limit value for the power storing device, in comparison with a case where a control time of the output reduction request does not overlap a control time of the upshift request, when the control time of the output reduction request overlaps the control time of the upshift request.

2. The control apparatus for the hybrid vehicle according to claim 1, wherein said transmission time changing device is configured to delay the start timing of the upshift when the extended execution time of the upshift exceeds a predetermined time.

3. The control apparatus for the hybrid vehicle according to claim 2, wherein said control apparatus further comprises a misfire predicting device configured to predict a misfire in the internal combustion engine, and said first charge controlling device is configured to maintain the output of the internal combustion engine at the predetermined value or more when the misfire in the internal combustion engine is predicted, and charges the power storing device with the output excess.

4. The control apparatus for the hybrid vehicle according to claim 3, wherein the hybrid vehicle further comprises a recirculating device configured to recirculate a part of emission gas from the internal combustion engine to an intake side, and said misfire predicting device is configured to predict a misfire caused by the emission gas from the internal combustion engine that is recirculated by the recirculating device.

5. The control apparatus for the hybrid vehicle according to claim 1, wherein said control apparatus further comprises a misfire predicting device configured to predict a misfire in the internal combustion engine, and said first charge controlling device is configured to maintain the output of the internal combustion engine at the predetermined value or more when the misfire in the internal combustion engine is predicted, and charges the power storing device with the output excess.

6. The control apparatus for the hybrid vehicle according to claim 5, wherein the hybrid vehicle further comprises a recirculating device configured to recirculate a part of emission gas from the internal combustion engine to an intake side, and said misfire predicting device is configured to predict a misfire caused by the emission gas from the internal combustion engine that is recirculated by the recirculating device.

* * * * *